(12) United States Patent
Grimaldos

(10) Patent No.: US 7,111,860 B1
(45) Date of Patent: Sep. 26, 2006

(54) TREADLE SCOOTER

(76) Inventor: Jorge Grimaldos, 376 Delano Pl., Fairview, NJ (US) 07022

( * ) Notice: Subject to any disclaimer, the term of this patent is extended or adjusted under 35 U.S.C. 154(b) by 0 days.

(21) Appl. No.: 10/280,561

(22) Filed: Oct. 25, 2002

(51) Int. Cl.
*B62M 1/04* (2006.01)

(52) U.S. Cl. .................. 280/253; 280/221; 280/257
(58) Field of Classification Search ............. 280/221, 280/253, 256–261, 87.041–87.043
See application file for complete search history.

(56) References Cited

U.S. PATENT DOCUMENTS

| | | | |
|---|---|---|---|
| 2,707,112 A | | 4/1955 | Ludwigson et al. ........ 280/221 |
| D210,087 S | | 2/1968 | Higgins et al. ............. D34/15 |
| 4,186,934 A | * | 2/1980 | Collings ..................... 280/221 |
| 4,411,442 A | * | 10/1983 | Rills .......................... 280/221 |
| 4,828,284 A | | 5/1989 | Sandgren .................... 280/221 |
| 4,861,054 A | * | 8/1989 | Spital ........................ 280/221 |
| 5,066,031 A | * | 11/1991 | Rinkewich .................. 280/221 |
| 5,294,140 A | | 3/1994 | Rinkewich .................. 280/221 |
| 5,368,321 A | | 11/1994 | Berman et al. ............. 280/221 |
| 5,520,401 A | | 5/1996 | Mohseni ..................... 280/221 |
| 6,173,981 B1 | * | 1/2001 | Coleman .................... 280/253 |
| 6,398,244 B1 | * | 6/2002 | Chueh ........................ 280/221 |

* cited by examiner

*Primary Examiner*—Lesley D. Morris
*Assistant Examiner*—L. Lum

(57) ABSTRACT

A treadle scooter for providing mobility to a user. The treadle scooter includes a frame assembly comprising a front end and a rear end. A steering assembly is rotatably coupled to the front end of the frame assembly and is designed for being actuated for directing the frame assembly in a desired direction. A front wheel is rotatably coupled to the steering assembly. A rear wheel is rotatably coupled to the rear end of the frame assembly. A drive assembly is coupled to the frame assembly and operationally coupled to the rear wheel for rolling the rear wheel across the support surface when the drive assembly is actuated. A transition assembly is operationally coupled between the drive assembly and the rear wheel. The transition assembly is for rotating the rear wheel when the transition assembly is rotated by the drive assembly.

16 Claims, 9 Drawing Sheets

TREADLE SCOOTER

BACKGROUND OF THE INVENTION

1. Field of the Invention

The present invention relates to treadle cycles and more particularly pertains to a new treadle scooter for providing mobility to a user.

2. Description of the Prior Art

The use of treadle cycles is known in the prior art. U.S. Pat. No. 4,828,284 describes a device for providing transportation to the user. Another type of treadle cycle is U.S. Pat. No. 2,707,112 having a scooter having a pair of pedals for actuating a pair of wheels to propel the scooter forward. U.S. Pat. No. 5,294,140 has a vehicle that includes a pair of foot treadles that are actuated by the feet of the user to propel the vehicle forward. U.S. Pat. No. 5,368,321 has an exercise cycle that allows the user to push on a pair of footboards to propel the exercise cycle. U.S. Pat. No. 5,520,401 has a cycle with steps to allow the user to propel the bicycle through a stair step motion of the user. U.S. Pat. No. Des. 210,087 shows a scooter body.

While these devices fulfill their respective, particular objectives and requirements, the need remains for a device that has certain improved features that allow the user to move frame assembly in a backwards direction without affecting the drive assembly.

SUMMARY OF THE INVENTION

The present invention meets the needs presented above by providing a transition assembly being operationally between the drive assembly and the rear wheel that allows the rear wheel to be rotated in the opposite direction without affecting the drive assembly.

Still yet another object of the present invention is to provide a new treadle scooter that provides a workout for the user by providing a stair step action to propel the frame assembly.

To this end, the present invention generally comprises a frame assembly comprising a front end and a rear end. The frame assembly is designed for being stood upon by the user. A steering assembly is rotatably coupled to the front end of the frame assembly. The steering assembly is designed for being actuated by the user when the user wishes direct the frame assembly in a desired direction. A front wheel is rotatably coupled to the steering assembly. The front wheel is designed for being rolled across a support surface whereby rotation of the steering assembly with respect to the frame assembly allows the user to change direction of travel of the frame assembly. A rear wheel is rotatably coupled to the rear end of the frame assembly. The rear wheel is designed for being rolled across the support surface. A drive assembly is coupled to the frame assembly and operationally coupled to the rear wheel. The drive assembly is designed for rolling the rear wheel across the support surface when the drive assembly is actuated by the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
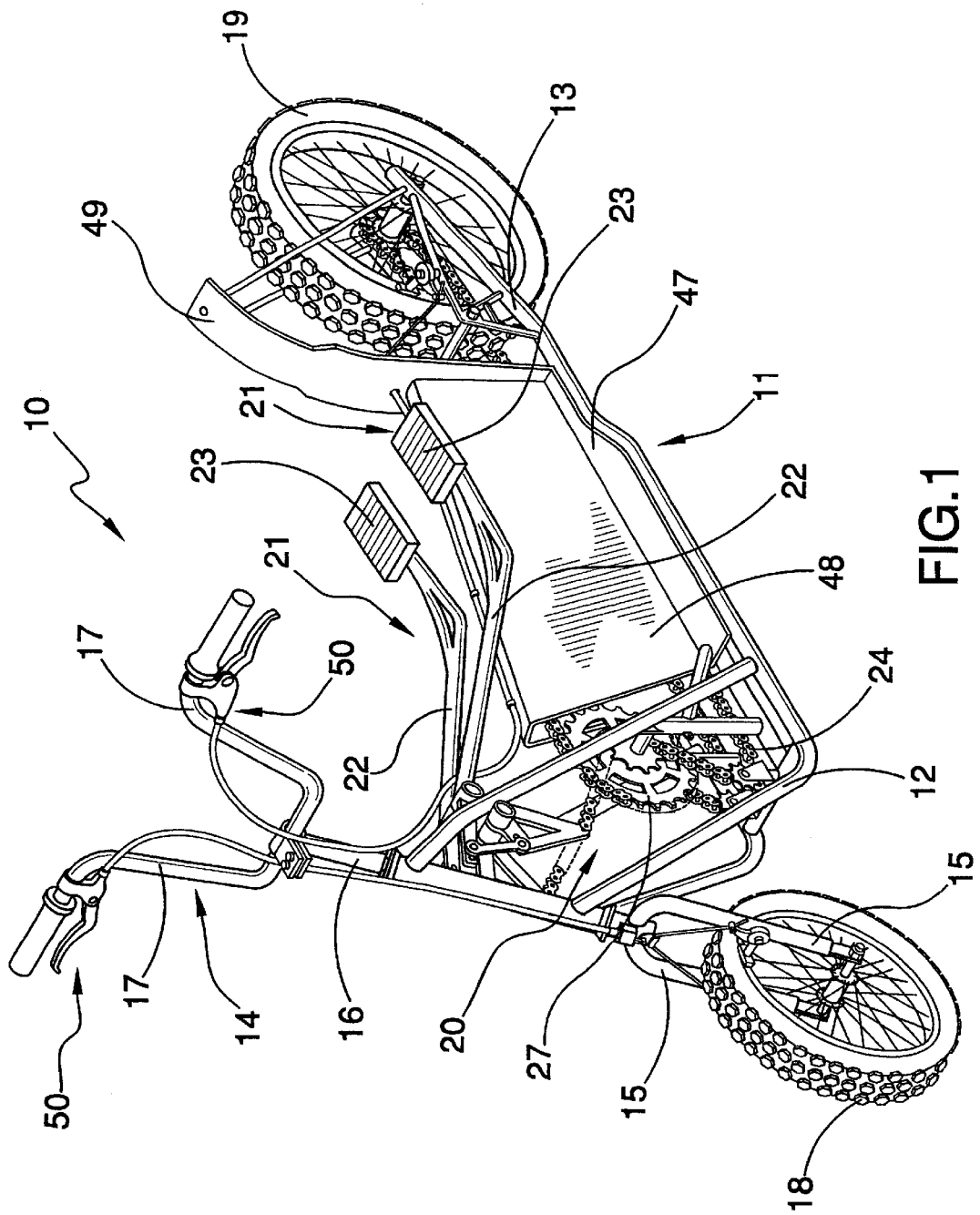
FIG. 1 is a front perspective view of a new treadle scooter according to the present invention.
Figure 2:
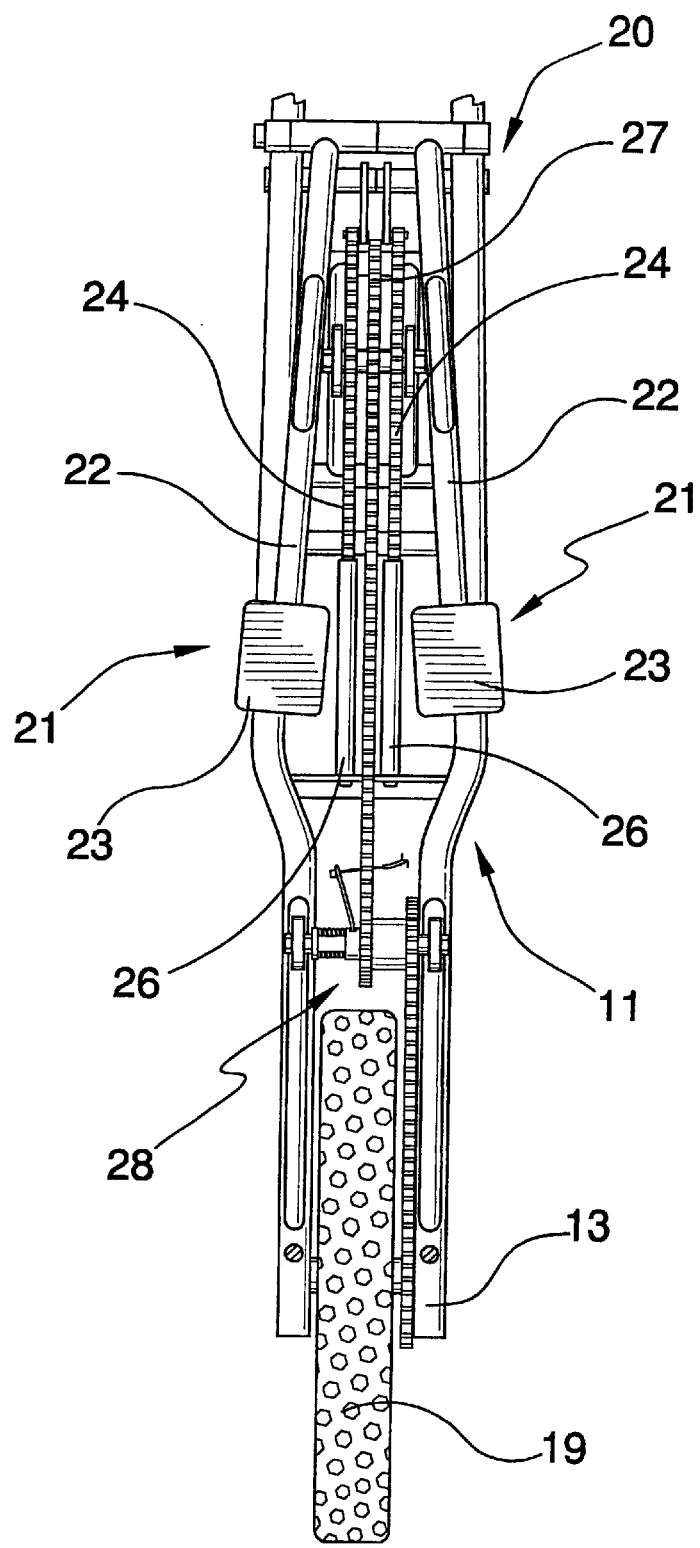
FIG. 2 is a top view of the present invention.
Figure 3:
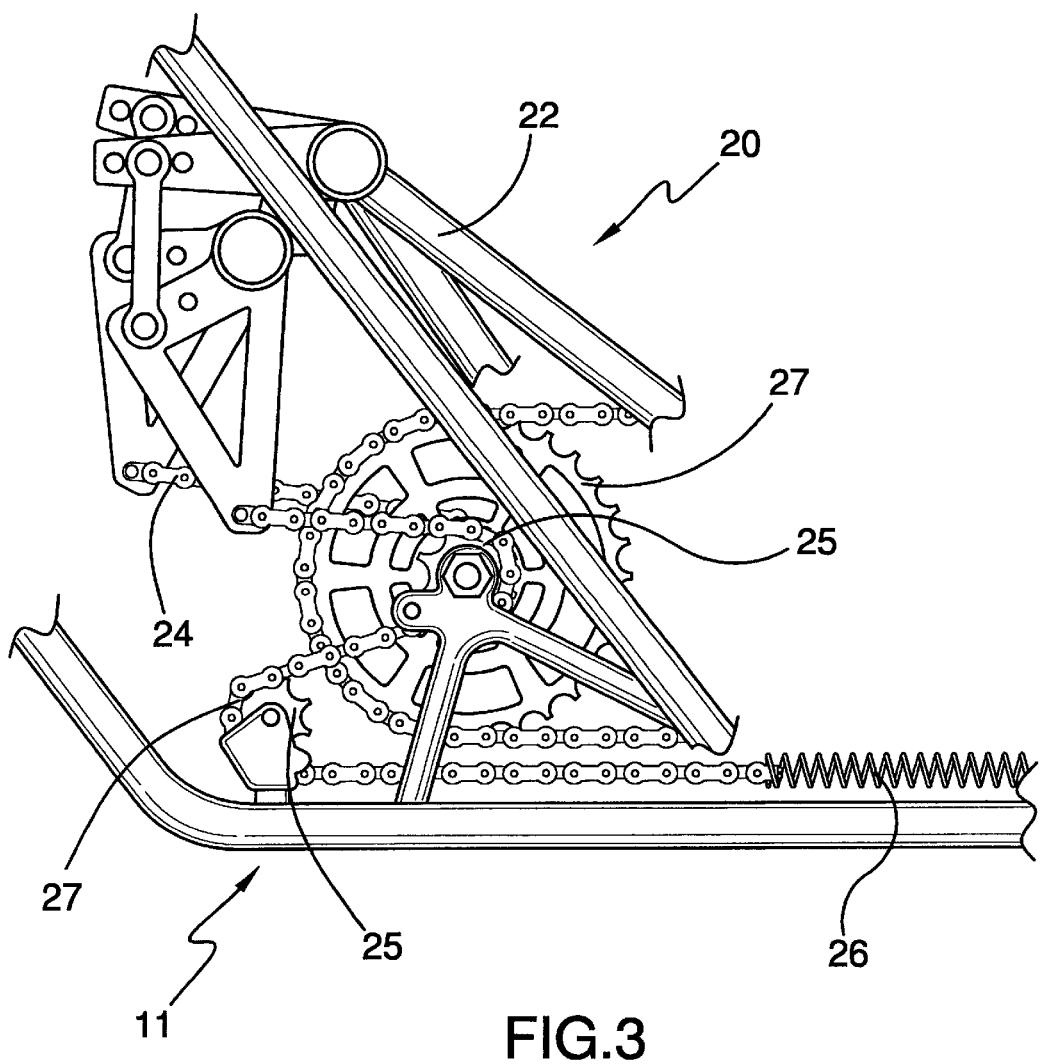
FIG. 3 is an enlarged side view of the drive assembly of the present invention.
Figure 4:
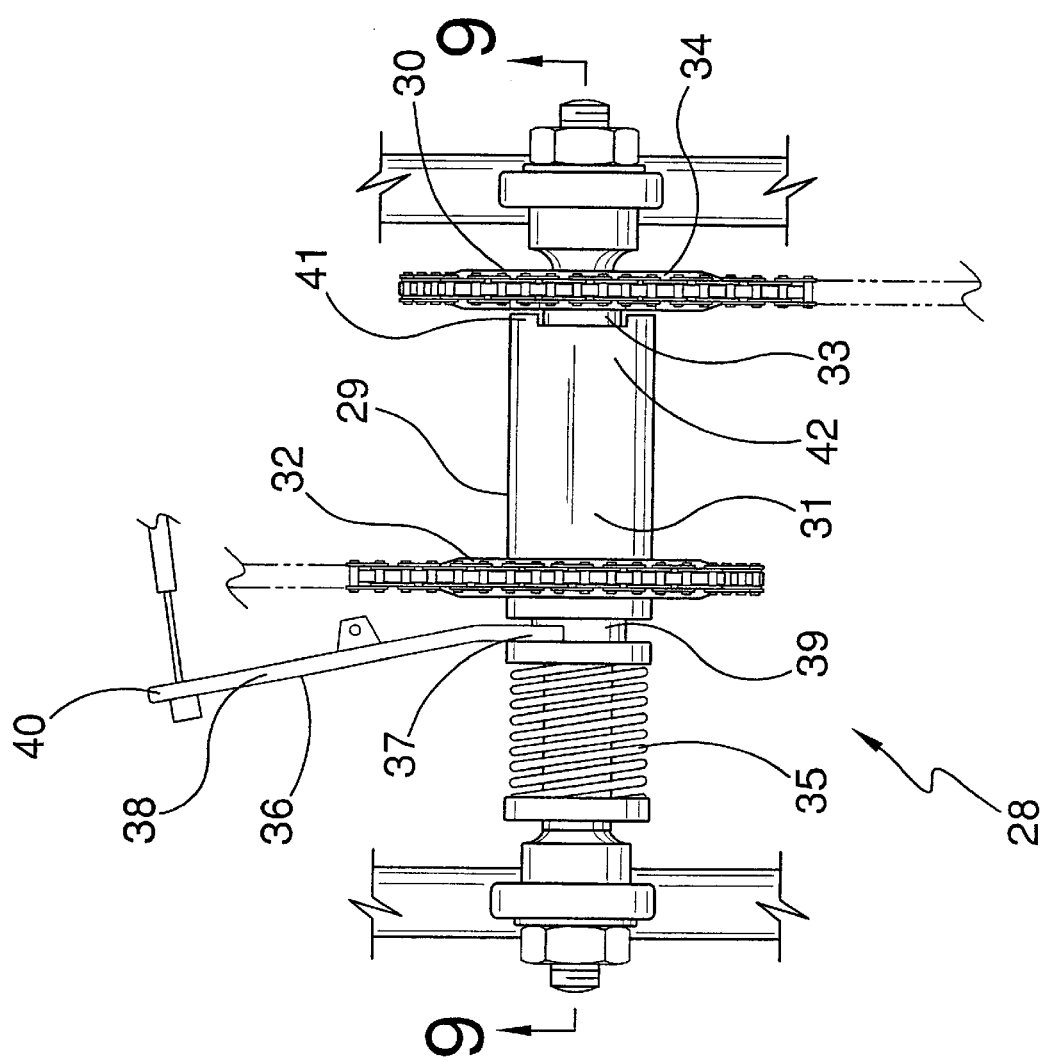
FIG. 4 is a top view of the transition assembly of the present invention.
Figure 5:
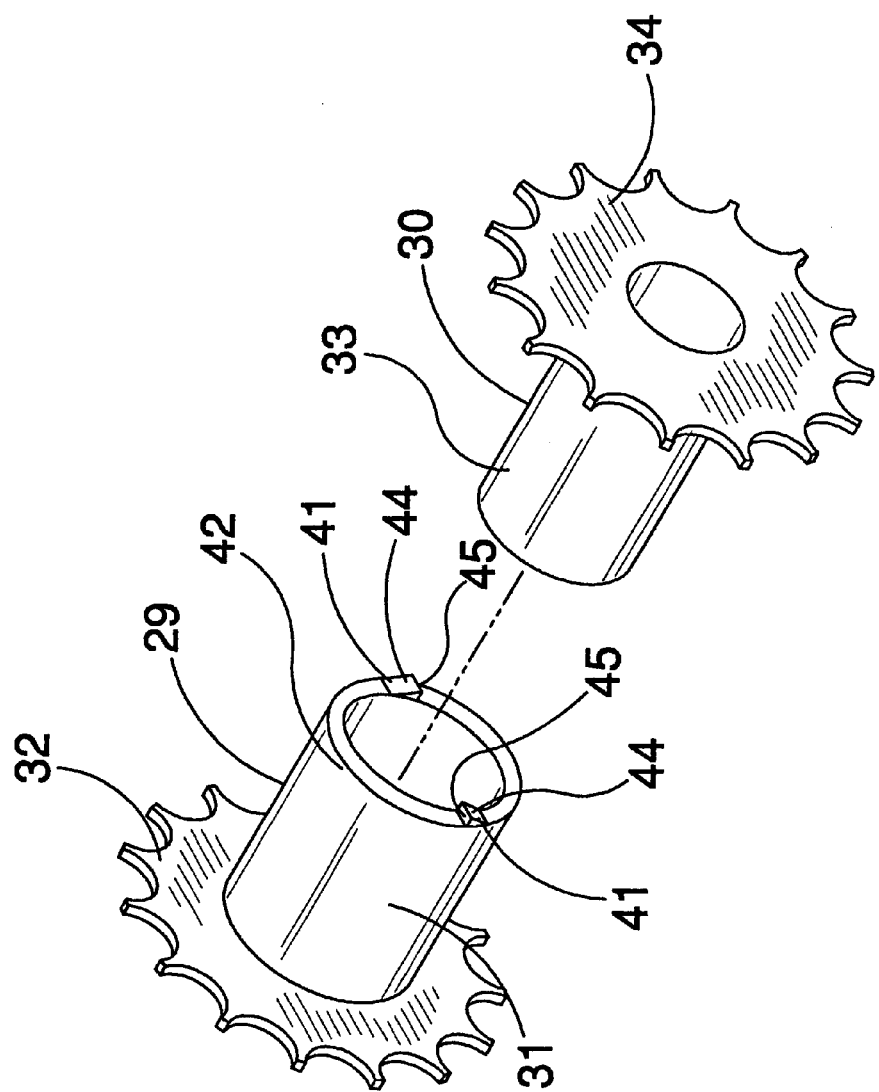
FIG. 5 is an exploded perspective view of the first gear portion and the second gear portion of the present invention.
Figure 6:
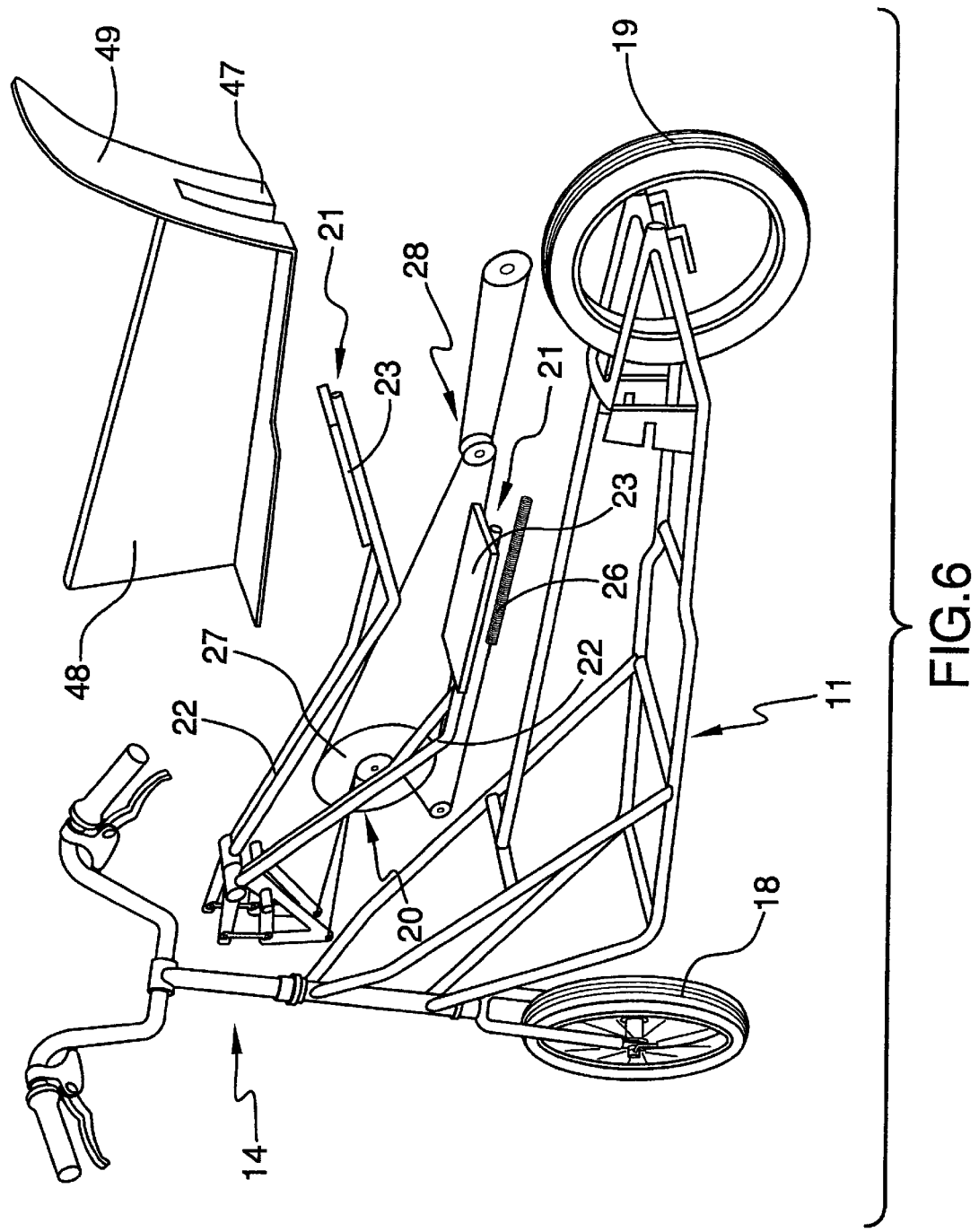
FIG. 6 is an exploded perspective view of the present invention.
Figure 7:
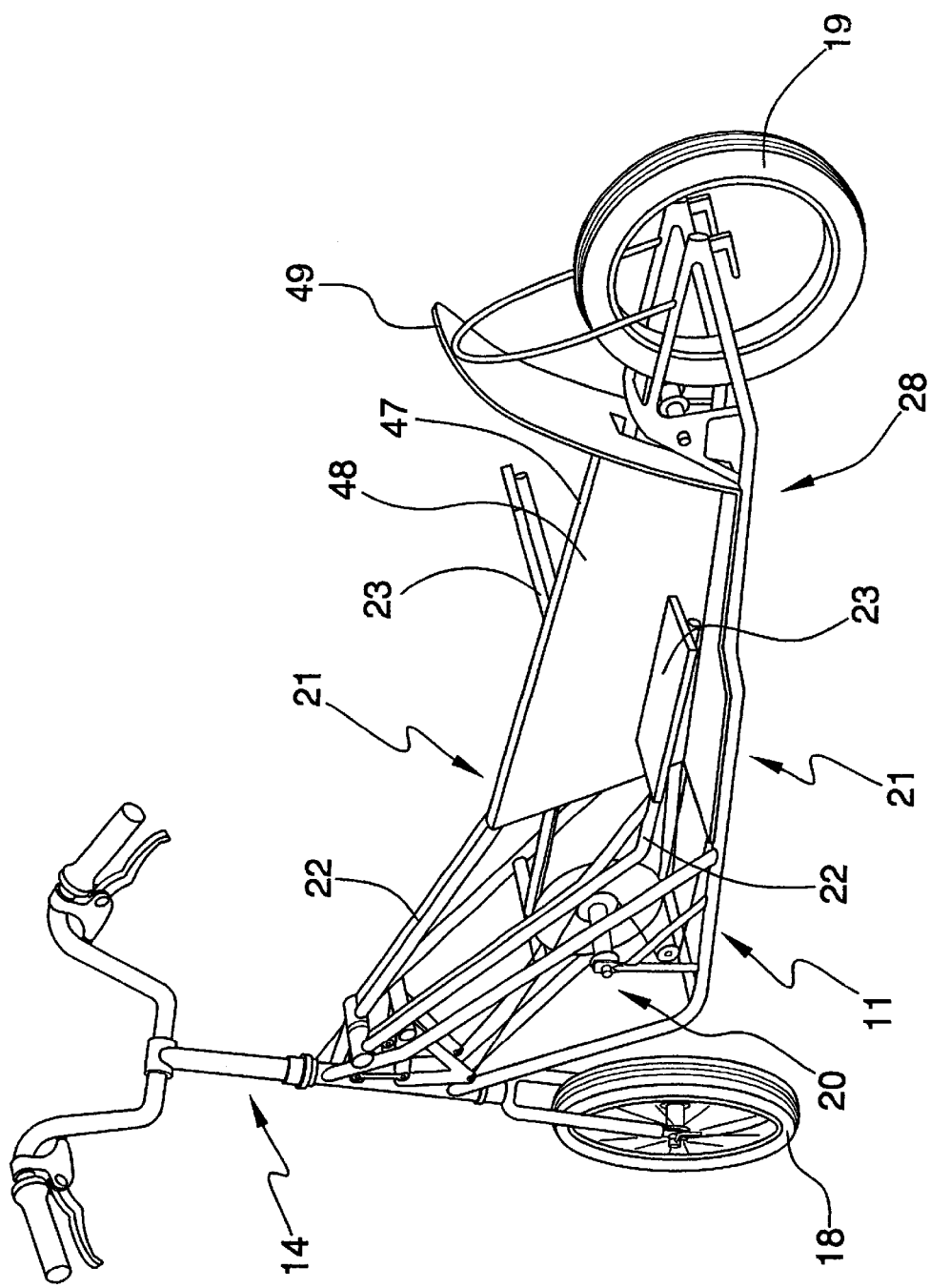
FIG. 7 is a rear perspective view of the present invention.
Figure 8:
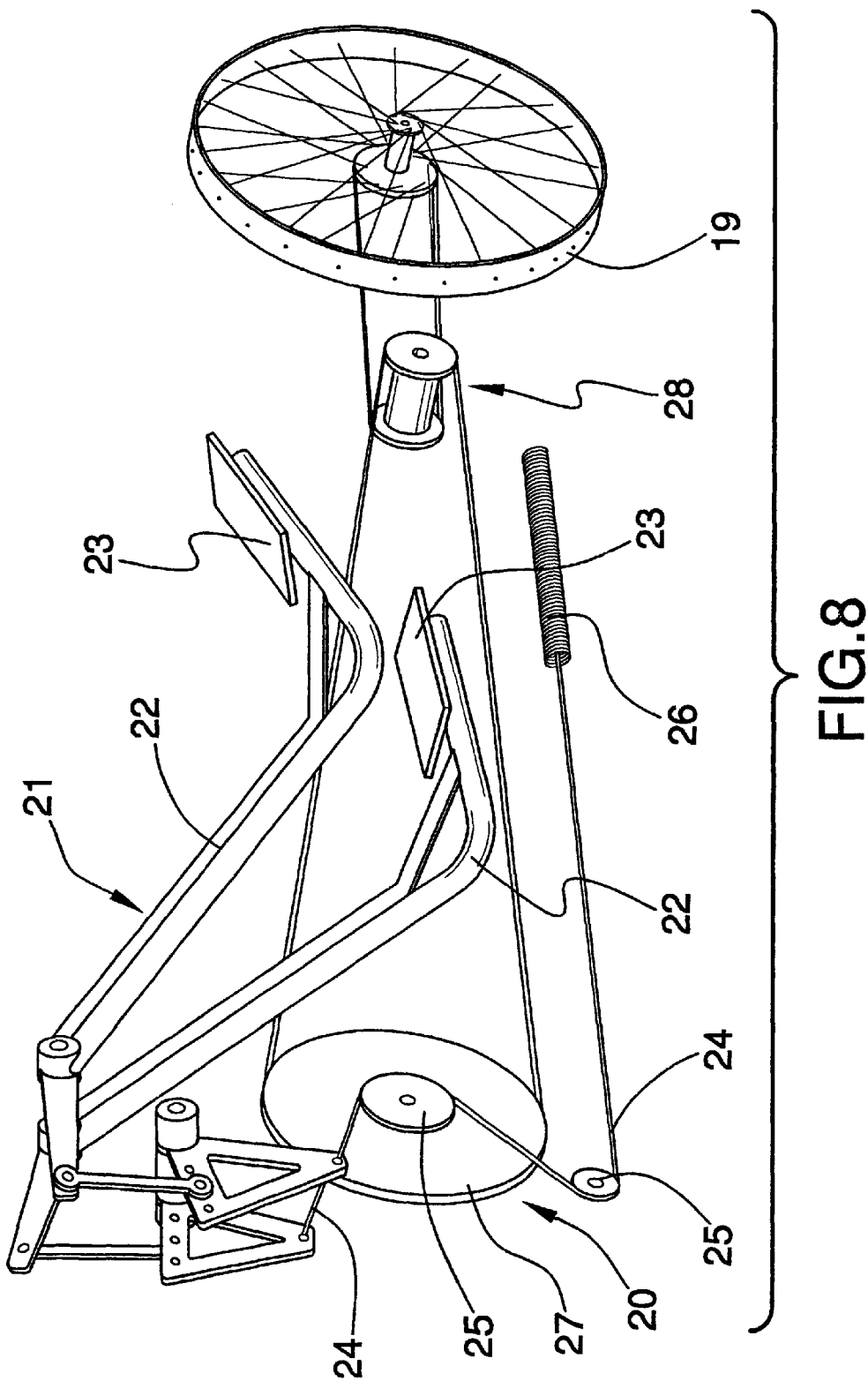
FIG. 8 is an exploded perspective view of the drive assembly of the present invention.
Figure 9:
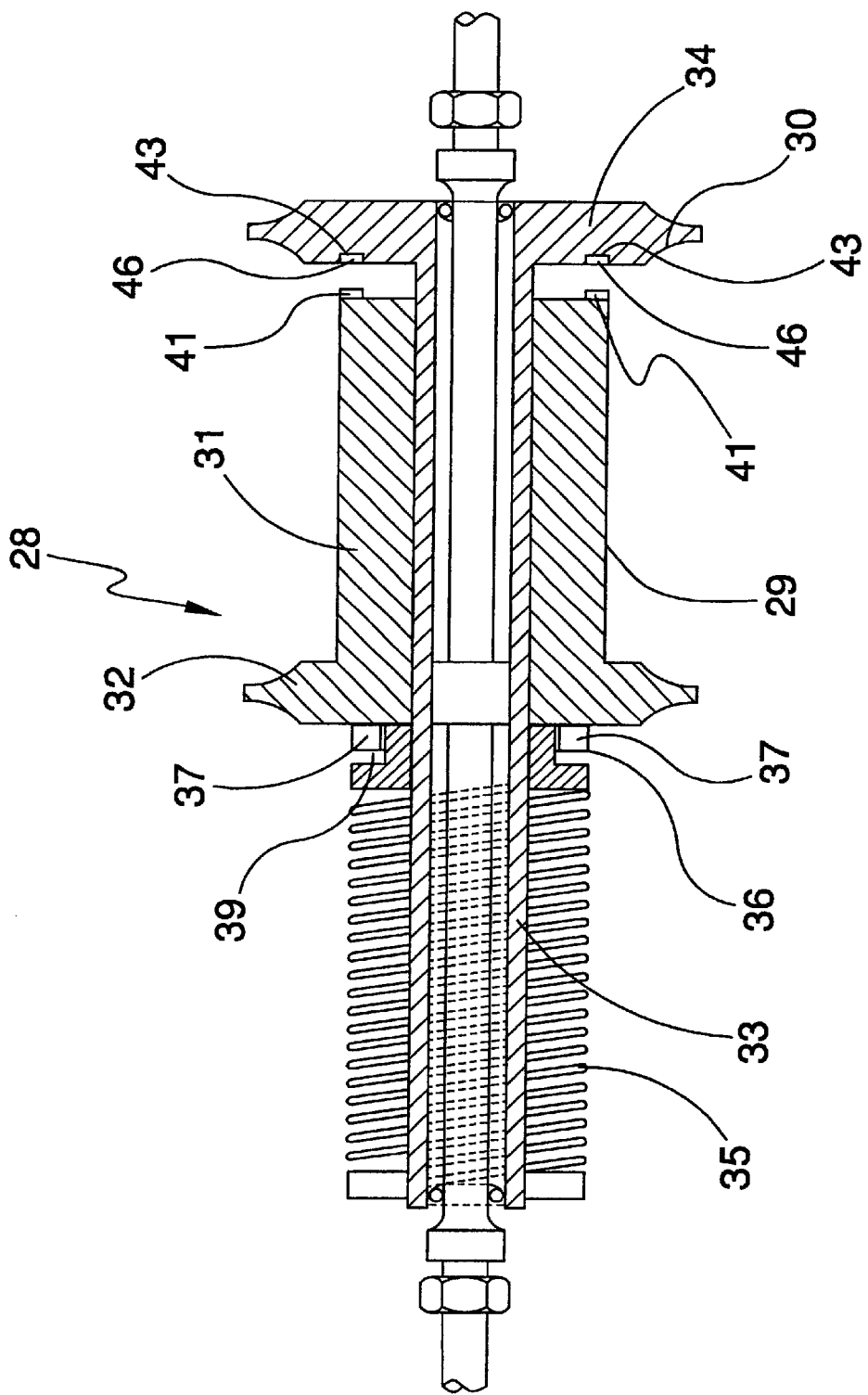
FIG. 9 is a cross-sectional view of the transition assembly of the present invention taken along line 9—9 of FIG. 4

With reference now to the drawings, and in particular to FIGS. 1 through 9 thereof, a new treadle scooter embodying the principles and concepts of the present invention and generally designated by the reference numeral 10 will be described.

As best illustrated in FIGS. 1 through 9, the treadle scooter 10 generally comprises a frame assembly 11 comprising a front end 12 and a rear end 13. The frame assembly 11 is designed for being stood upon by the user.

A steering assembly 14 is rotatably coupled to the front end 12 of the frame assembly 11. The steering assembly 14 is designed for being actuated by the user when the user wishes direct the frame assembly 11 in a desired direction. The steering assembly 14 comprises a pair of forks 15 coupled to a tube member 16. The steering assembly 14 comprises a pair of handle bars 17 coupled to the tube member 16 opposite the forks 15. The handle bars 17 are designed for being gripped by the user to turn the steering assembly 14 and change direction.

A front wheel 18 is rotatably coupled to the steering assembly 14 whereby the front wheel 18 is positioned between the forks 15 of the steering assembly 14. The front wheel 18 is designed for being rolled across a support surface whereby rotation of the steering assembly 14 with respect to the frame assembly 11 allows the user to change direction of travel of the frame assembly 11.

A rear wheel 19 is rotatably coupled to the rear end 13 of the frame assembly 11. The rear wheel 19 is designed for being rolled across the support surface.

A drive assembly 20 is coupled to the frame assembly 11 and operationally coupled to the rear wheel 19. The drive assembly 20 is designed for rolling the rear wheel 19 across the support surface when the drive assembly 20 is actuated by the user.

The drive assembly 20 comprises a pair of pedal assemblies 21. Each of the pedal assemblies 21 is pivotally coupled to the frame assembly 11. Each of the pedal assemblies 21 is operationally coupled to the rear wheel 19. Each of the pedal assemblies 21 is designed for being actuated by a foot of the user whereby actuation of each of the pedal assemblies 21 by the user rotates the rear wheel 19 with respect to the frame assembly 11 when the user wishes to propel the frame assembly 11 across the support surface. One of the pedal assemblies 21 is pivotally isolated from the other of the pedal assemblies 21 whereby one of the pedal assemblies 21 may pivoted with respect to the frame assembly 11 independent of the other of the pedal assemblies 21 for propelling the frame assembly 11 across the support surface or permits the user stand on both pedal assemblies 21 without pivoting either of the pedal assemblies 21 while the frame assembly 11 is propelled across the support surface.

Each of the pedal assemblies 21 comprises a pedal portion 22. The pedal portion 22 is pivotally coupled to the frame assembly 11. A free end 23 of the pedal portion 22 is designed for being engaged by one of the feet of the user whereby the user pushes down on the free end 23 of the pedal portion 22 with the foot to rotate the rear wheel 19 when the frame assembly 11 is be propelled across the support surface.

Each of the pedal assemblies 21 comprises an actuation chain 24. The actuation chain 24 is coupled to the pedal portion 22 of an associated one of the pedal assemblies 21. The actuation chain 24 is operationally coupled to a pair of actuation gears 25 whereby each of the actuation gears 25 is rotatably coupled to the frame assembly 11 for being rotated when the pedal portion 22 of the associated one of the pedal assemblies 21 is pushed on by the foot of the user.

Each of the pedal assemblies 21 comprises a pedal biasing member 26. The pedal biasing member 26 is coupled to the actuation chain 24 opposite the pedal portion 22 of the associated one of the pedal assemblies 21 and the frame assembly 11. The pedal biasing member 26 biases the pedal portion 22 of the associated one of the pedal assemblies 21 into a raised position when the user lifts the foot from the pedal portion 22.

The drive assembly 20 comprises a transfer gear 27. The transfer gear 27 is operationally coupled to one of the actuation gears 25 of each of the pedal assemblies 21 whereby rotation of the associated one of the actuation gears 25 of the pedal portion 22s in a first direction rotates the transfer gear 27 in the first direction. The transfer gear 27 is operationally coupled to the rear wheel 19 for rotating the rear wheel 19 when the pedal portion 22s of each of the pedal assemblies 21 are actuated by the user. Each of the pedal assemblies 21 is adjustable for adjusting the amount of rotation that the transfer gear 27 is rotated for each full actuation of each of the pedal assemblies 21.

A transition assembly 28 is operationally coupled between the transfer gear 27 of the drive assembly 20 and the rear wheel 19. The transition assembly 28 is for rotating the rear wheel 19 when the transition assembly 28 is rotated by the drive assembly 20 when the drive assembly 20 is actuated by the user.

The transition assembly 28 comprises a first gear portion 29 and a second gear portion 30. The first gear portion 29 is operationally coupled to the drive assembly 20. The second gear portion 30 is operationally coupled to the rear wheel 19. The first gear portion 29 selectively engages the second gear portion 30 for transferring rotation of the first gear portion 29 to the second gear portion 30 when the first gear portion 29 engages the second gear portion 30. The second gear portion 30 is rotatable independent of the first gear portion 29 for permitting the rear wheel 19 to be rotated in the opposite direction to back up the frame assembly 11 when the first gear portion 29 is disengaged from the second gear portion 30.

The first gear portion 29 comprises a sleeve member 31 and a first gear member 32. The first gear member 32 of the first gear portion 29 is operationally coupled to the drive assembly 20. The first gear member 32 is coupled to the sleeve member 31 of the first gear portion 29.

The second gear portion 30 comprises a shaft member 33 and a second gear member 34. The second gear member 34 is coupled to the shaft member 33. The second gear member 34 is operationally coupled to the rear wheel 19. The shaft member 33 slidably extends through the sleeve member 31 whereby the sleeve member 31 is slidably positionable along a length of the shaft member 33. The sleeve member 31 selectively engages the second gear member 34 for transferring rotation of the first gear member 32 to the second gear member 34 for rotating the rear wheel 19.

The transition assembly 28 comprises a gear biasing member 35. The gear biasing member 35 is positioned between the sleeve member 31 of the first gear portion 29 and the shaft member 33 of the second gear portion 30. The gear biasing member 35 biases the sleeve member 31 of the first gear portion 29 against the second gear member 34 of the second gear portion 30.

The transition assembly 28 comprises a yoke portion 36. The yoke portion 36 engages the sleeve member 31 of the first gear portion 29. The yoke portion 36 slides the first gear portion 29 along the shaft member 33 of the second gear portion 30 for disengaging the sleeve member 31 of the first gear portion 29 from the second gear member 34 when the yoke portion 36 is actuated by the user.

The yoke portion 36 of the transition assembly 28 comprises a pair of arm members 37 and a lever member 38. Each of the arm members 37 extends around the sleeve member 31 of the first gear portion 29 and are positioned in an annular channel 39 of the sleeve member 31 of the first gear portion 29. The lever member 38 is coupled to the arm members 37 and pivotally coupled to the frame assembly 11. A free end 40 of the lever member 38 is designed for being selectively actuated by the user, such as through a cable to the steering assembly 14 or foot actuator, for pivoting the arm members 37 away from the second gear member 34 of the second gear portion 30 whereby the sleeve member 31 of the first gear portion 29 disengages the second gear member 34 of the second gear portion 30 when the user wishes to disengage the rear wheel 19 from the drive assembly 20 to roll the frame assembly 11 backwards.

The first gear portion 29 comprises a plurality of engagement tabs 41. Each of the engagement tabs 41 is positioned at a distal end 42 of the sleeve member 31 of the first gear portion 29 whereby each of the engagement tabs 41 selectively engages one of a plurality of engagement apertures 43 of the second gear member 34 of the second gear portion 30 for transferring rotational motion of the first gear portion 29 to the second gear portion 30 for rotating the rear wheel 19.

Each of the engagement tabs 41 has an angled face 44 and an engaging face 45. The angled face 44 is for forcing the sleeve member 31 away from the second gear member 34 when the second gear member 34 is rotated opposite of the first gear member 32. The engaging face 45 engages an interior face 46 of the engagement apertures 43 for transferring rotational movement of the first gear member 32 to the second gear member 34.

A shroud portion 47 is coupled to the frame assembly 11. The shroud portion 47 is positioned over a portion of the drive assembly 20 whereby the shroud portion 47 is designed for preventing clothing of the user from becoming entangled in the portion of the drive assembly 20. The shroud portion 47 comprises a main member 48 and a fender member 49. The main member 48 is designed for being positioned over the portion of the drive assembly 20 whereby the main member 48 is designed for preventing clothes of the user from becoming tangled in the portion of the driver assembly. The fender member 49 extends from the main member 48 whereby the fender member 49 is aligned with the rear wheel 19. The fender member 49 is designed for deflecting debris shed from the rear wheel 19 away from the user.

A plurality of brake assemblies 50 are coupled to the steering assembly 14. One of the brake assemblies 50 is operationally coupled to the rear wheel 19 whereby the associated one of the brake assemblies 50 slows rotation of the rear wheel 19 when the associated one of the brake assemblies 50 is actuated by the user. The other of the brake assemblies 50 is operationally coupled to the front wheel 18 whereby the associated one of the brake assemblies 50 slows rotation of the front wheel 18 when the associated one of the brake assemblies 50 is actuated by the user.

In use, the user mounts the frame assembly 11 and places their feet on the free end 23 of the pedal portion 22s. The user then pushes down on the pedal portion 22s in an alternating rhythm, as if the user is walking up stairs, and drives the rear wheel 19. The user uses the steering assembly 14 to guide the front wheel 18 in a desired direction. The user uses the braking assemblies to slow and stop the frame assembly 11. The user can back the frame assembly 11 up by actuating the lever arm of the transition assembly 28 to disengage the first gear portion 29 from the second gear portion 30 to allow the rear wheel 19 and the second gear portion 30 to rotate freely from the first gear portion 29.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A treadle scooter for being ridden by a user, the treadle scooter comprising
    a frame assembly comprising a front end and a rear end, said frame assembly being adapted for being stood upon by the user,
    a steering assembly being rotatably coupled to said front end of said frame assembly, the steering assembly being adapted for being actuated by the user when the user wishes to direct said frame assembly in a desired direction,
    a front wheel being rotatably coupled to said steering assembly, said front wheel being adapted for being rolled across a support surface such that rotation of said steering assembly with respect to said frame assembly allows the user to change direction of travel of said frame assembly,
    a rear wheel being rotatably coupled to said rear end of said frame assembly, said rear wheel being adapted for being rolled across the support surface,
    a drive assembly being coupled to said frame assembly, and operationally coupled to said rear wheel, said drive assembly being adapted for rolling said rear wheel across the support surface when said drive assembly is actuated by the user,
    a transition assembly being operationally coupled between said drive assembly and said rear wheel, said transition assembly being for rotating said rear wheel when said transition assembly is rotated by said drive assembly when said drive assembly is actuated by the user, and,
    said transition assembly comprising a first gear portion and a second gear portion, said first gear portion being operationally coupled to said drive assembly, said second gear portion being operationally coupled to said rear wheel, said first gear portion selectively engaging said second gear portion for transferring rotation of said first gear portion to said second gear portion when said first gear portion engages said second gear portion, said second gear portion being rotatable independently of said first gear portion for permitting said rear wheel to be rotated in the opposite direction to back up the frame assembly when the first gear portion is disengaged from said second gear portion.

2. The treadle scooter as set forth in claim 1, further comprising:
    said drive assembly comprising a pair of pedal assemblies, each of said pedal assemblies being pivotally coupled to said frame assembly, each of said pedal assemblies being operationally coupled to said rear wheel, each of said pedal assemblies being adapted for being actuated by a foot of the user such that actuation of each of said pedal assemblies by the user rotates said rear wheel with respect to said frame assembly when the user wishes to propel said frame assembly across the support surface, one of said pedal assemblies being pivotally isolated from the other of said pedal assemblies such that one of said pedal assemblies may pivoted with respect to said frame assembly independent of the other of said pedal assemblies for propelling the frame assembly across the support surface.

3. The treadle scooter as set forth in claim 2, further comprising:
    each of said pedal assemblies comprising a pedal portion, said pedal portion being pivotally coupled to said frame assembly, a free end of said pedal portion being adapted for being engaged by one of the feet of the user such that the user pushes down on said free end of said pedal portion with the foot to rotate said rear wheel when said frame assembly is be propelled across the support surface.

4. The treadle scooter as set forth in claim 3, further comprising:
    each of said pedal assemblies comprising an actuation chain, said actuation chain being coupled to said pedal portion of an associated one of said pedal assemblies, said actuation chain being operationally coupled to a pair of actuation gears such that each of said actuation gears is rotatably coupled to said frame assembly for being rotated when said pedal portion of the associated one of said pedal assemblies is pushed on by the foot of the user.

5. The treadle scooter as set forth in claim 4, further comprising:

each of said pedal assemblies comprising a pedal biasing member, said pedal biasing member being coupled to said actuation chain opposite said pedal portion of the associated one of said pedal assemblies and said frame assembly, said pedal biasing member biasing said pedal portion of the associated one of said pedal assemblies into a raised position when the user lifts the foot from said pedal portion.

6. The treadle scooter as set forth in claim 4, further comprising:

said drive assembly comprising a transfer gear, said transfer gear being operationally coupled to one of said actuation gears of each of said pedal assemblies such that rotation of the associated one of said actuation gears of said pedal portions in a first direction rotates said transfer gear in the first direction, said transfer gear being operationally coupled to said rear wheel for rotating said rear wheel when said pedal portions of each of said pedal assemblies is acutated by the user.

7. The treadle scooter as set forth in claim 1, further comprising:

said first gear portion comprising a sleeve member and a first gear member, said first gear member of said first gear portion being operationally coupled to said drive assembly, said first gear member being coupled to said sleeve member of said first gear portion;

said second gear portion comprising a shaft member and a second gear member, said second gear member being coupled to said shaft member, said second gear member being operationally coupled to said rear wheel, said shaft member slidably extending through said sleeve member such that said sleeve member is slidably positionable along a length of said shaft member, said sleeve member selectively engaging said second gear member for transferring rotation of said first gear member to said second gear member for rotating said rear wheel.

8. The treadle scooter as set forth in claim 7, further comprising:

said transition assembly comprising a gear biasing member, said gear biasing member being positioned between said sleeve member of said first gear portion and said shaft member of said second gear portion, said gear biasing member biasing said sleeve member of said first gear portion against said second gear member of said second gear portion.

9. The treadle scooter as set forth in claim 7, further comprising:

said transition assembly comprising a yoke portion, said yoke portion engaging said sleeve member of said first gear portion, said yoke portion sliding said first gear portion along said shaft member of said second gear portion for disengaging said sleeve member of said first gear portion from said second gear member when said yoke portion is actuated by the user.

10. The treadle scooter as set forth in claim 9, further comprising:

said yoke portion of said transition assembly comprising a pair of arm members and a lever member, each of said arm members extending around said sleeve member of said first gear portion and being positioned in an annular channel of said sleeve member of said first gear portion, said lever member being coupled to said arm members and pivotally coupled to said frame assembly, a free end of said lever member being adapted for being selectively actuated by the user for pivoting said arm members away from said second gear member of said second gear portion such that said sleeve member of said first gear portion disengages said second gear member of said second gear portion when the user wishes to disengage said rear wheel from said drive assembly to roll said frame assembly backwards.

11. The treadle scooter as set forth in claim 7, further comprising:

said first gear portion comprising a plurality of engagement tabs, each of said engagement tabs being positioned at a distal end of said sleeve member of said first gear portion such that each of said engagement tabs selectively engages one of a plurality of engagement apertures of said second gear member of said second gear portion for transferring rotational motion of said first gear portion to said second gear portion for rotating said rear wheel.

12. The treadle scooter as set forth in claim 11, further comprising:

each of said engagement tabs having an angled face and an engaging face, said angled face being for forcing said sleeve member away from said second gear member when said second gear member is rotated opposite of said first gear member, said engaging face engaging an interior face of said engagement apertures for transferring rotational movement of said first gear member to said second gear member.

13. The treadle scooter as set forth in claim 1, further comprising:

a shroud portion being coupled to said frame assembly, said shroud portion being positioned over a portion of said drive assembly such that said shroud portion is adapted for preventing clothing of the user from becoming entangled in said portion of said drive assembly.

14. The treadle scooter as set forth in claim 13, further comprising:

said shroud portion comprising a main member and a fender member, said main member is adapted for being positioned over said portion of said drive assembly such that said main member is adapted for preventing clothes of the user from becoming tangled in said portion of said driver assembly, said fender member extending from said main member such that said fender member is aligned with said rear wheel, said fender member being adapted for deflecting debris shed from said rear wheel away from the user.

15. The treadle scooter as set forth in claim 1, further comprising:

at least one brake assembly being coupled to said steering assembly, said brake assembly being operationally coupled to said rear wheel such that said brake assembly slows rotation of the rear wheel when said brake assembly is actuated by the user.

16. A treadle scooter for being ridden by a user, the treadle scooter comprising:

a frame assembly comprising a front end and a rear end, said frame assembly being adapted for being stood upon by the user;

a steering assembly being rotatably coupled to said front end of said frame assembly, said steering assembly being adapted for being actuated by the user when the user wishes to direct said frame assembly in a desired direction;

a front wheel being rotatably coupled to said steering assembly, said front wheel being adapted for being rolled across a support surface such that rotation of said steering assembly with respect to said frame assembly allows the user to change direction of travel of said frame assembly;

a rear wheel being rotatably coupled to said rear end of said frame assembly, said rear wheel being adapted for being rolled across the support surface;

a drive assembly being coupled to said frame assembly and operationally coupled to said rear wheel, said drive assembly being adapted for rolling said rear wheel across the support surface when said drive assembly is actuated by the user;

said drive assembly comprising a pair of pedal assemblies, each of said pedal assemblies being pivotally coupled to said frame assembly, each of said pedal assemblies being operationally coupled to said rear wheel, each of said pedal assemblies being adapted for being actuated by a foot of the user such that actuation of each of said pedal assemblies by the user rotates said rear wheel with respect to said frame assembly when the user wishes to propel said frame assembly across the support surface, one of said pedal assemblies being pivotally isolated from the other of said pedal assemblies such that one of said pedal assemblies may pivoted with respect to said frame assembly independent of the other of said pedal assemblies for propelling the frame assembly across the support surface;

each of said pedal assemblies comprising a pedal portion, said pedal portion being pivotally coupled to said frame assembly, a free end of said pedal portion being adapted for being engaged by one of the feet of the user such that the user pushes down on said free end of said pedal portion with the foot to rotate said rear wheel when said frame assembly is propelled across the support surface;

each of said pedal assemblies comprising an actuation chain, said actuation chain being coupled to said pedal portion of an associated one of said pedal assemblies, said actuation chain being operationally coupled to a pair of actuation gears such that each of said actuation gears is rotatably coupled to said frame assembly for being rotated when said pedal portion of the associated one of said pedal assemblies is pushed on by the foot of the user;

each of said pedal assemblies comprising a pedal biasing member, said pedal biasing member being coupled to said actuation chain opposite said pedal portion of the associated one of said pedal assemblies and said frame assembly, said pedal biasing member biasing said pedal portion of the associated one of said pedal assemblies into a raised position when the user lifts the foot from said pedal portion;

said drive assembly comprising a transfer gear, said transfer gear being operationally coupled to one of said actuation gears of each of said pedal assemblies such that rotation of the associated one of said actuation gears of said pedal portions in a first direction rotates said transfer gear in the first direction, said transfer gear being operationally coupled to said rear wheel for rotating said rear wheel when said pedal portions of each of said pedal assemblies is actuated by the user;

a transition assembly being operationally coupled between said transfer gear of said drive assembly and said rear wheel, said transition assembly being for rotating said rear wheel when said transition assembly is rotated by said drive assembly when said drive assembly is actuated by the user;

said transition assembly comprising a first gear portion and a second gear portion, said first gear portion being operationally coupled to said drive assembly, said second gear portion being operationally coupled to said rear wheel, said first gear portion selectively engaging said second gear portion for transferring rotation of said first gear portion to said second gear portion when said first gear portion engages said second gear portion, said second gear portion being rotatable independent of said first gear portion for permitting said rear wheel to be rotated in the opposite direction to back up the frame assembly when said first gear portion is disengaged from said second gear portion;

said first gear portion comprising a sleeve member and a first gear member, said first gear member of said first gear portion being operationally coupled to said drive assembly, said first gear member being coupled to said sleeve member of said first gear portion;

said second gear portion comprising a shaft member and a second gear member, said second gear member being coupled to said shaft member, said second gear member being operationally coupled to said rear wheel, said shaft member slidably extending through said sleeve member such that said sleeve member is slidably positionable along a length of said shaft member, said sleeve member selectively engaging said second gear member for transferring rotation of said first gear member to said second gear member for rotating said rear wheel;

said transition assembly comprising a gear biasing member, said gear biasing member being positioned between said sleeve member of said first gear portion and said shaft member of said second gear portion, said gear biasing member biasing said sleeve member of said first gear portion against said second gear member of said second gear portion;

said transition assembly comprising a yoke portion, said yoke portion engaging said sleeve member of said first gear portion, said yoke portion sliding said first gear portion along said shaft member of said second gear portion for disengaging said sleeve member of said first gear portion from said second gear member when said yoke portion is actuated by the user;

said yoke portion of said transition assembly comprising a pair of arm members and a lever member, each of said arm members extending around said sleeve member of said first gear portion and being positioned in an annular channel of said sleeve member of said first gear portion, said lever member being coupled to said arm members and pivotally coupled to said frame assembly, a free end of said lever member being adapted for being selectively actuated by the user for pivoting said arm members away from said second gear member of said second gear portion such that said sleeve member of said first gear portion disengages said second gear member of said second gear portion when the user wishes to disengage said rear wheel from said drive assembly to roll said frame assembly backwards;

said first gear portion comprising a plurality of engagement tabs, each of said engagement tabs being positioned at a distal end of said sleeve member of said first gear portion such that each of said engagement tabs selectively engages one of a plurality of engagement apertures of said second gear member of said second gear portion for transferring rotational motion of said first gear portion to said second gear portion for rotating said rear wheel;

each of said engagement tabs having an angled face and an engaging face, said angled face being for forcing said sleeve member away from said second gear member when said second gear member is rotated opposite of said first gear member, said engaging face engaging an interior face of said engagement apertures for transferring rotational movement of said first gear member to said second gear member;

a shroud portion being coupled to said frame assembly, said shroud portion being positioned over a portion of said drive assembly such that said shroud portion is adapted for preventing clothing of the user from becoming entangled in said portion of said drive assembly;

said shroud portion comprising a main member and a fender member, said main member is adapted for being positioned over said portion of said drive assembly such that said main member is adapted for preventing clothes of the user from becoming tangled in said portion of said driver assembly, said fender member extending from said main member such that said fender member is aligned with said rear wheel, said fender member being adapted for deflecting debris shed from said rear wheel away from the user;

a plurality of brake assemblies being coupled to said steering assembly, one of said brake assemblies being operationally coupled to said rear wheel such that the associated one of said brake assemblies slows rotation of the rear wheel when the associated one of said brake assemblies is actuated by the user, the other of said brake assemblies being operationally coupled to said front wheel such that the associated one of said brake assemblies slows rotation of said front wheel when the associated one of said brake assemblies is actuated by the user.

* * * * *